United States Patent Office 3,647,918
Patented Mar. 7, 1972

3,647,918
EPOXY RESIN AND DIGLYCIDYLISOALKYL-
AMINE COMPOSITION
Johannes Wöllner, Kapellen Kreis, Moers, Martin Karl
Cherubim, Rheinkamp-Eick, and Friedrich Gerhard
Henn, Homberg (Lower Rhine), Germany, assignors to
Deutsche Texaco Aktiengesellschaft, Hamburg, Germany
No Drawing. Filed Aug. 25, 1969, Ser. No. 852,919
Claims priority, application Germany, Aug. 27, 1968,
P 17 95 238.4
Int. Cl. C08g 45/06
U.S. Cl. 260—830 TW          7 Claims

ABSTRACT OF THE DISCLOSURE

An epoxy resin composition comprising the reaction product of an amino compound containing at least two amino groups per molecule and an epoxide mixture of (a) from 30–90% by weight of a liquid diglycidyl ether of an aromatic compounud having at least two

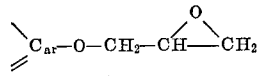

groups per molecule wherein $\geqslant C_{ar}$ is a carbon atom belonging to an aromatic system, and (b) from 70–10% by weight of a liquid nitrogen linked glycidyl containing compound having at least two glycidyl groups per molecule. The process comprises reacting at about ambient temperatures the above reaction components and permitting the reaction product to cure.

This invention relates to a process for the production of epoxy resins from epoxides and amino compounds and in particular to the production of epoxy resins from a mixture of glycidyl ether of aromatic compounds and nitrogen linked glycidyl containing compounds with amino compounds and to the epoxy resin compositions obtained therefrom.

As used in the specification and claims, the term "glycidyl" refers to any compound having at least one 2,3-epoxypropyl group

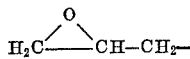

therein.

It is konwn that epoxy resins can be prepared by the reaction of the diglycidyl ether of 2,2-bis(4'-hydroxy-penhyl)propane (commonly known as bisphenol A), this entire compound being hereinafter referred to as DGE of BPA, with amines, for example, with triethylenetetraamine at room temperature. A disadvantage of this known method is, however, the relatively high viscosity of the DGE of BPA itself or admixed with amino compounds prior to curing. Owing to this undesirable high viscosity, the uncured reaction composition is not suitable for use as a pourable composition in the casting of molded pieces. Moreover, with such uncured reaction compositions it is very difficult to incorporate fillers and similar agents therein, which have to be evenly distributed throughout the composition. Attempts to overcome this disadvantage of high viscosity by use of solvents have been successful in so far as viscosity reduction is concerned. However, use of the thinners and/or solvents causes other faults, such as the formation of bubbles or shrinkage cracks.

It is also known that epoxy resins can be prepared by reacting N,N-diglycidylalkylamines of relative short-chained alkyl groups, with polyamines, for example, with triethylenetetraamine. In comparison with the DGE of BPA, the viscosity of N,N-diglycidyllalkylamines and their uncured reaction compositions with polyamines is relatively low, but the latter uncured compositions exhibit the serious disadvantage of not curing at room temperature even after several days standing.

An object of the present invention is an improved epoxy resin composition and process for the production of an epoxy resin while avoiding the above disadvantages of the prior art processes. A further object of the present invention is an improved epoxy resin composition and a process for the production of epoxy resins by the reaction of mixtures of epoxides with amino compounds having at least two amino groups per molecule.

The epoxy resin composition of the present invention comprises the reaction product of an amino compound having at least two amino groups per molecule with an epoxide mixture comprising (a) From 30 to 90% by weight of a liquid glycidyl ether of an aromatic compound having at least two

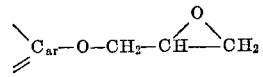

groups per molecule, wherein $\geqslant C_{ar}$ is a carbon atom belonging to an aromatic system, and from (b) 70 to 10% by weight of a liquid nitrogen linked glycidyl containing compound having at least two nitrogen linked glycidyl groups per molecule.

In the process of the present invention the above specified epoxide mixture is reacted with the above specified amino compound at about ambient temperatures and the resulting admixture is permitted to cure to form the epoxy resin. A particularly preferred epoxide mixture consists of 40 to 80% by weight of the compound in (a) above and 60 to 20% by weight of the compound in (b) above. A preferred reaction mixture has the reaction components present therein in the ratios of from about 1.2 to about 1.3 epoxide groups of the epoxide mixture per NH bond of the amino reactant.

The reaction composition to produce the epoxy resins of the present invention has a sufficiently low viscosity that one can add thereto relatively large amounts of filler materials for the production of very low-cost plastics and plastic materials. Owing to their relatively low viscosity, the reaction compositions for the resin products are suitable for use in all molding methods, and are especially suited for use in resin casting processes. Moreover, the reaction to form the resin product is completed within a time period of from about 1 to 7 days at room temperature during which period hard resins are formed.

A representative liquid compound containing the required two

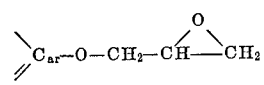

groups is the DGE of BPA.

Excellent results have been attained in the process of the present invention using N,N-diglycidylisoalkylamines, for example, N,N-diglycidylisopropylamine or N,N-diglycidylisobutylamine, as representative of compounds having at least two nitrogen linked glycidyl groups per molecule. The use of N,N-diglycidylisopropylamine and its mixtures with N,N'-diglycidyl-N,N'-diisopropyl-1,3-diamino-2-hydroxypropane with or without addition of fillers, has also resulted in resin products with relatively high flexural strength values.

Suitable polyamino compounds having at least two amino groups per molecule for use in the process of the present invention incude ethylenediamine, diethylenetriamine, triethylenetetraamine or polyaminoamide compounds such as the condensation products of dimerized fatty acids with aliphatic polyamines having residual free amino groups.

The flexural strengths of the resulting cured resins made by the process of the present invention for the most part far exceed the flexural strength values obtained using the DGE of BPA as the sole epoxide component and cured under identical conditions.

Following is a description by way of examples of methods of carrying out the process of the present invention.

EXAMPLE 1

The diglycidyl ether of 2,2-bis(4'-hydroxyphenyl)propane (I) DGE of BPA, was mixed with N,N-diglycidylisopropylamine (II) and triethylenetetramine (III), and the gel time (GT) at room temperature was determined. The results are shown in Table A below.

TABLE A

| I | | II | | III | | I+II/III [1] | GT (hours) |
|---|---|---|---|---|---|---|---|
| Grams | (1) | Grams | (1) | Grams | (1) | | |
| 0.0 | 0.0 | 22.0 | 257 | 4.9 | 201 | 1.28 | No gelation after 7 days. |
| 2.2 | 12.9 | 22.0 | 257 | 5.1 | 209 | 1.29 | 23.5. |
| 19.2 | 113 | 11.0 | 129 | 4.9 | 201 | 1.20 | 5 to 20. |

[1] Milliequivalents of epoxide or N-H.

Table A sets forth the amounts of reactants in grams and in milliequivalents. The table shows that varying amounts of DGE of BPA (I) were mixed with varying amounts of the diglycidylamine reactant (II) and varying amounts of the aliphatic polyamine (III). The table also shows the ratios of the epoxide groups to the NH bonds of the polyamine.

From the data of Table A it is evident that by the process of the invention one obtains curable resin products in from about 5 to about 24 hours at room temperature. The table also shows that in the absence of an essential component of the reaction composition, namely, the DGE of BPA, one is unable to obtain gelation even after 7 days standing.

In Examples 2 through 5, inclusive, the reactants are used in the approximately same equivalent amounts as shown by the ratios set forth in Table A.

EXAMPLE 2

Flexural strengths and deflections of the mixtures consisting of DGE of BPA (I), N,N-diglycidylisopropylamine (II), and equivalent quantities of triethylenetetraamine (III) after curing at 20° C. during 5 days (without fillers) are set forth in Table B below.

TABLE B

| Percent weight | | Flexural strength (Kp./cm.²) [1] | Deflection (mm.) |
|---|---|---|---|
| I | II | | |
| 30 | 70 | 708 | 14.2 |
| 50 | 50 | 999 | 9.2 |
| 70 | 30 | 838 | 5.3 |
| 90 | 10 | 622 | 3.9 |
| 100 | 0 | 312 | 1.9 |

[1] Kp.=kiloponds=981 kg. wt./981 cm./sec.² (mass in the metric gravitational system).

EXAMPLE 3

Flexural strengths and deflections of mixtures consisting of DGE of BPA (I), N,N - diglycidylisobutylamine (IV), and equivalent quantities of triethylenetetraamine (III) after curing at 20° C. during 5 days (without fillers) are shown in Table C below.

TABLE C

| Percent weight | | Flexural strength (Kp./cm.²) | Deflection (mm.) |
|---|---|---|---|
| I | IV | | |
| 30 | 70 | 146 | 15.0 |
| 50 | 50 | 858 | 14.9 |
| 70 | 30 | 946 | 7.3 |
| 90 | 10 | 679 | 4.0 |
| 100 | 0 | 312 | 1.9 |

EXAMPLE 4

Flexural strengths and deflections of mixtures consisting of DGE of BPA (I), a mixture (V) of epoxy compounds, and equivalent quantities of triethylenetetraamine (III) after curing at 20° C. during 5 days (without fillers) are shown in Table D below. The mixture (V) comprises about 55% by weight of N,N'-diglycidyl - N,N' - diisopropyl-1,3-diamino-2-hydroxypropane and about 45% by weight of N,N-diglycidylisopropylamine.

TABLE D

| Percent weight | | Flexural strength (Kp./cm.²) | Deflection (mm.) |
|---|---|---|---|
| I | V | | |
| 30 | 70 | 256 | 15.0 |
| 50 | 50 | 1010 | 7.2 |
| 70 | 30 | 862 | 4.9 |
| 90 | 10 | 617 | 3.7 |
| 100 | 0 | 312 | 1.9 |

EXAMPLE 5

Flexural strengths and deflections of mixtures consisting of DGE of BPA (I), a mixture (VI) of epoxy compounds, and equivalent quantities of triethylenetetraamine (III) after curing at 20° C. during 5 days (without fillers) are shown in Table E below. The mixture (VI) comprises about 55% by weight of N,N'-diglycidyl-N,N'-diisobutyl-1,3-diamino-2-hydroxypropane and about 45% by weight of N,N-diglycidylisobutylamine.

TABLE E

| Percent weight | | Flexural strength (Kp./cm.²) | Deflection (mm.) |
|---|---|---|---|
| I | VI | | |
| 30 | 70 | 271 | 15.0 |
| 50 | 50 | 734 | 18.4 |
| 70 | 30 | 723 | 5.1 |
| 90 | 10 | 547 | 3.7 |
| 100 | 0 | 312 | 1.9 |

The data in Tables B–E, inclusive, above show the flexural strength and deflection values obtained with a number of cured resins prepared by the process of the present invention. It is to be noted that the flexural strengths reach a maxima in the region of epoxide mixtures having from about 50 to 70% of DGE of BPA.

The reaction compositions prepared according to the present invention are not only distinguished by relatively low viscosities in the initial stages, rapid curing at room or ambient temperatures, but also by the superior properties of the cured products. The cured products have excellent dielectric properties and high water resistance. Furthermore, the cured products show higher flexibilities than those obtained from DGE of BPA as the sole epoxide component in most instances. The cured products are therefore highly suitable for use in lacquers and plastics, whether filled or not. Moreover, they can be used for coatings, casting materials, adhesives, glues, putties, and binders. They are excellent materials for use in the electrical and electronic industries. Further fields of application are their use for reactive thinners, as modification agents for other prepolymers and polymers, for impregnating purposes, in laminated plastics, glass fiber laminated plastics, as ion exchangers, as lubricant additives, in the chemical treatment of textiles, as tool and pattern materials, as filling materials for hollow spaces, in the consolidation of geological formations, and of coal in coal seams etc.

Obviously, many modifications and variations of the invention as hereinbefore set forth may be made without departing from the spirit and scope thereof and therefore only such limitations should be imposed as are indicated in the appended claims.

We claim:

1. An epoxy resin composition capable of curing at room temperature comprising an epoxide mixture of (a) 30 to 90% by weight of the diglycidyl ether of 2,2-bis(4'-hydroxyphenyl) propane; (b) 70 to 10% by weight of an N,N-diglycidylisoalkylamine, and an aliphatic polyamine compound having at least two amino groups per molecule, said polyamino compound being selected from the group consisting of ethylenediamine, diethylenetriamine, triethylenetetraamine and the condensation product of dimerized fatty acid with an aliphatic polyamine having a residual free amino group, and wherein the ratio of the epoxide groups in the epoxide mixture to the NH bonds of the polyamino compound is from about 1.2 up to about 1.3/1.

2. An epoxy resin composition according to claim 1 wherein the N,N-diglycidylisoalkylamine is N,N-digglycidylisopropylamine.

3. An epoxy resin composition according to claim 1 wherein the N,N-diglycidylisoalkylamine is N,N-diglycidylisobutylamine.

4. An epoxy resin composition according to claim 1 wherein the N,N-diglycidylisoalkylamine is a mixture consisting of 40 to 60% by weight N,N-diglycidylisopropylamine and 60 to 40% by weight of N,N'-diglycidyl-N,N'-diisopropyl-1,3-diamino-2-hydroxypropane.

5. An epoxy resin composition according to claim 1 wherein the N,N-diglycidylisoalkylamine is a mixture consisting of 40 to 60% by weight N,N'-diglycidylisobutylamine and 60 to 40% by weight N,N'-diglycidyl-N,N'-diisobutyl-1,3-diamino-2-hydroxypropane.

6. An epoxy resin composition according to claim 1 wherein the polyamino compound is triethylenetetraamine.

7. An epoxy resin composition according to claim 1 wherein the polyamino compound is ethylenediamine.

References Cited
UNITED STATES PATENTS

| | | | |
|---|---|---|---|
| 2,884,406 | 4/1959 | Wegler et al. | 260—47 EP |
| 2,921,037 | 1/1960 | Andres et al. | 260—47 EP X |
| 2,951,822 | 9/1960 | Reinking | 260—830 |
| 3,449,375 | 6/1969 | Newey | 260—830 X |

WILLIAM H. SHORT, Primary Examiner

T. E. PERTILLA, Assistant Examiner

U.S. Cl. X.R.

44—1 R; 117—161 ZB; 161—184, 105; 252—9; 260—2.1 R, 47 CN

PO-1050
(5/69)

UNITED STATES PATENT OFFICE
CERTIFICATE OF CORRECTION

Patent No. 3,647,918          Dated March 7, 1972

Inventor(s) Johannes Wollner, Martin K. Cherubim & Friedrich G. Henn

It is certified that error appears in the above-identified patent and that said Letters Patent are hereby corrected as shown below:

Col. 1, line 21   Change "compounud" to --compound--
Col. 1, line 51   Change "penhyl" to --phenyl--
Col. 4, Table E   Under Deflection, "18.4" should be --14.8--
Col. 5, line 11   Change "digglyci" to --diglyci--

Signed and sealed this 21st day of November 1972.

(SEAL)
Attest:

EDWARD M. FLETCHER, JR.
Attesting Officer

ROBERT GOTTSCHALK
Commissioner of Patents